May 1, 1928.
C. A. AGTHE
PRODUCTION OF EMULSIONS
Filed March 12, 1923
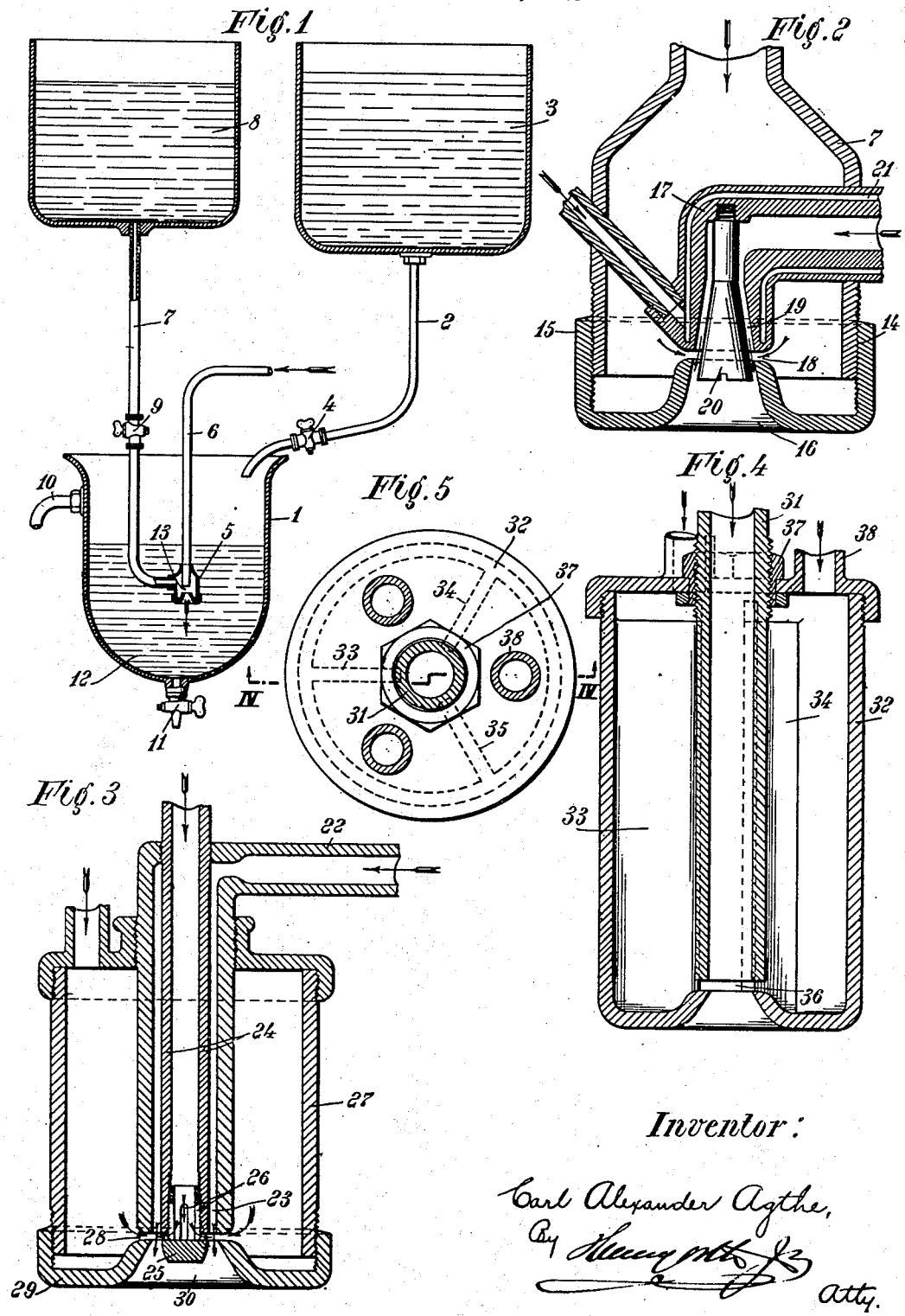
Inventor:
Carl Alexander Agthe,
By [signature]
Atty.

Patented May 1, 1928.

1,668,136

UNITED STATES PATENT OFFICE.

CARL ALEXANDER AGTHE, OF ZURICH, SWITZERLAND.

PRODUCTION OF EMULSIONS.

Application filed March 12, 1923, Serial No. 624,497, and in Germany March 13, 1922.

In many cases it is necessary to intimately mix substances which are non-soluble or reluctantly soluble in order to utilize the substances in the form of emulsions, suspensions, gels, jellies and similar disperse systems or in order to cause them to enter into reactions. The simplest method of attaining this condition consists in the mechanical dispersion of the component parts. As a rule the substance forming the disperse phase must be very finely disintegrated in order to be emulsified in the dispersion medium.

The hitherto known processes for effecting the dispersion by mechanical means present the disadvantages that they either do not allow of attaining a sufficiently high degree of dispersion or that they are of such a complicated nature that they preclude the treatment of large quantities of substances and particularly when cheap products have to be manufactured.

It has already been proposed to produce disperse systems by mechanically atomizing liquids, melting substances with the aid of compressed gases and vapours and by embodying the atomized substances in a dispersion medium. This process has been carried out in atomizing the substance to be emulsified by means of compressed gas, compressed air, high pressure steam and the like, whereupon the atomized substance is embodied in the dispersion medium to be used. The known process has the drawback that considerable losses of the substances to be mixed with each other cannot be avoided, further some of the small particles obtained by the atomizing process agglomerate and form undesirable large particles.

The subject matter of the present invention is a process for the continuous production of emulsions, suspensions and similar disperse systems and for the carrying out of reactions, by mechanically atomizing liquids by means of a jet of compressed gases or vapours acting as atomizing agent and by incorporating the atomized substances in a dispersion medium, which process is characterized by the fact that the atomizing device is submerged below the level of the dispersion medium and that the atomizing agent is caused to condense within the dispersion medium. This novel process is adapted to overcome completely the disadvantages mentioned above. The obtained degree of dispersion is exceedingly great and the manner of working is very simple and economical.

If for instance the dispersion medium is an aqueous solution, then the atomizing is effected by means of a steam jet which is projected into the aqueous dispersion medium and is conducted into or on the substance to be dispersed. The whole atomizing process is carried out below the level of the aqueous dispersion medium so that the separated particles can immediately distribute themselves in or diffuse through the dispersion medium whilst the steam is condensed.

If on the other hand the disperse system has to be produced in which, for instance, petroleum acts as the dispersion medium, petroleum vapour or another kind of vapour adapted to condense in petroleum such as for instance benzine vapour, are chosen as atomizing agents and the liquid substance to be brought into the dispersed phase is conducted onto or into this vapour jet. Also in this case the atomizing effect occurs below the level of the petroleum forming the dispersion medium.

The advantages of the working of the present process are evident. No losses of the material occur and the atomized small particles of the substance to be dispersed are quickly diffused in the dispersion medium so that any agglomeration of the particles by pounding against each other is avoided. Preferably a suitable protective agent or colloid is added to the dispersion medium whereby the action of the latter is enhanced.

Several constructional arrangements for carrying into effect the process according to the present invention are illustrated on the accompanying drawings, in which:

Fig. 1 shows in a diagrammatic manner the device for carrying out the dispersion of a substance, Figs. 2 and 3 are vertical sections through two modifications of the atomizing device, and Figs. 4 and 5 illustrate in a vertical section along line IV—IV in Fig. 5 and in a plan view respectively a further modified atomizing device.

Referring now to Fig. 1, 1 denotes a receptacle in which the disperse system is produced. The receptacle 1 is partially filled with a dispersion medium supplied by means of a pipe 2 leading from a receptacle 3. The supply is controlled by means of a valve 4. An atomizing device 5 is submerged in the liquid of the receptacle 1, a steam pipe 6 leading to the device 5. The latter is connected to a receptacle 8, by means of a pipe 7, which receptacle contains the substance to be dispersed. The pipe 7 is provided with a valve 9 and the receptacle 1 is provided with an overflow 10 and an emptying valve 11.

First of all the receptacle 1 is filled with the dispersion medium, i. e. with a 4% solution of potash-soap, derived from the receptacle 3, up to such a level that the atomizing device is completely submerged in the dispersion medium 12. Then the steam jet is allowed to pass through the device 5 and simultaneously the valve 9 is opened, whereby mineral oil, i. e. the liquid to be emulsified, is conducted into the steam jet at 13. The steam projecting through a round opening causes an atomizing of the oil, which is discharged through the circular gap 13 into the steam jet, the steam jet carrying the small oil particles with it and projects the latter into the dispersion medium 12. The oil is fed by gravity to the atomizing device 5. When the process is started the valve 4 is opened to admit such a quantity of the dispersion medium that an emulsion of a desired concentration is discharged through the overflow 10. The substance to be dispersed, i. e. the oil in the above case, may also be forced into the atomizing device 5 by means of a force pump.

Obviously the process is the more economical the less steam is utilized for atomizing the substance to be dispersed.

As the atomizing effect depends only on the surface of the steam jet which comes in direct contact with the substance to be dispersed and with the emulsifying liquid, and the mechanical force of the inner parts of the jet is not utilized for atomizing purposes, the cross-sectional area of the steam jet should be kept as small as possible and the contact area with the substance to be dispersed should be as large as possible.

It is therefore advantageous to make use of the possibility of effecting a mechanical atomizing by the atomizing agent, for instance by the steam, in causing the latter to be discharged through a slot shaped opening. In this manner a steam jet is obtained that has a small cross-sectional area in relation to the surface with which the substance to be dispersed contacts.

Fig. 2 shows a detail of the device illustrated in Fig. 1, i. e. an atomizing device with a nozzle. The end of the pipe 7 supplying the substance to be dispersed is enlarged and is provided at its lower part with interior screw thread with which the interior screw thread of a cover 15 cooperates. The cover is provided with a central opening 16 formed by a flange the upper edge of which is situated at a small distance from the lower end of a steam supply conduit 17, whereby an annular opening or gap 18 is formed through which the substance to be dispersed gets into contact with the steam jet. The latter flows through the annular nozzle 19 formed by the inner wall of the pipe 17 and an inserted member 20 screwed into the pipe 17; the steam jet passes through the opening 16. The conduit 17 is provided with hollow walls and through the hollow spaces or jackets 21 thus formed cooling water or heating gases, whichever are required in a special case, may be led, in order to effect an equalization between the temperatures of the steam and of the atomizing agent, so that for instance an undesirable boiling or hardening of the substance to be dispersed within the nozzle is avoided. The insertion 20 illustrated is of a conical shape, but it might also be made cylindrical. By interchanging the inserted member 20 the width of the annular opening 19 may be altered. By screwing the cover 15 more or less to the conduit 7 the height of the opening 18 and thereby the degree of dispersion may be altered. The discharge opening for the steam is thus an annular opening to the outer circumference of which the substance to be dispersed is conducted. This arrangement presents the advantage of permitting in a simple manner an alternation of the cross-sectional area of the steam jet with a given nozzle.

With an annular opening, i. e. a hollow jet for the steam discharge it is economically advantageous to conduct the substance to be dispersed from outside and from inside towards the hollow jet, whereby the substance to be dispersed and supplied to the interior of the hollow jet may be different to the substance to be dispersed and supplied to the exterior of said jet.

An atomizing device of this type is shown in a vertical section in Fig. 3. The steam is injected through the conduit 22 and is discharged through the annular opening 23 in the form of a hollow jet, against the inner and the outer surfaces of which the medium to be dispersed is conducted by means of the conduits 24 and the receptacle 27 respectively. The part 25 provided at the lower end of the conduit 24 may be adjusted by screwing it more or less into the conduit 24. The part 25 is provided with openings 26 through which the liquid to be dispersed gets into contact with the interior of the hollow steam jet. The contact of the substance to be dispersed with the exterior of the hollow steam jet is effected by the gap 28 between cover 29 screwed to the lower end of the receptacle 27 and the lower end of the pipe 22. The cover 29 is provided with a central opening 30 into which the part 25 projects, whereby an annular discharge opening for the steam and the particles of the substance to be dispersed and carried away by the steam is formed.

It must be assumed that the nozzle of the atomizing device according to Fig. 2 as well as that according to Fig. 3 is arranged within the receptacle 1 illustrated in Fig. 1.

The hollow jet may be of an elliptical and of any other suitable shape instead of being a hollow cylinder.

Owing to these arrangements the process may be carried out very economically and it may be employed in all cases in which large quantities or substances have to be treated at smallest costs. Thus, for instance, the impregnation of wood and of other porous material with tar, coal-tar-oil, Carbolineum, creosotes and similar substances in the form of emulsions is a success from the economic point of view only when the preparation of emulsion is simple and cheap. The same criticism holds good for the treatment of roads with emulsions of oil, tar, asphaltum and the like or with mixtures of these materials, further for washing and extracting grease by means of emulsions of benzine, benzol, carbontetrachloride and similar purifying and extracting substances or mixtures of the latter, particularly in washing wool, in which case large quantities are utilized.

The process is also well adapted for carrying out reactions between substances which are non-soluble or reluctantly soluble one in the other. Also in this case it is a great advantage when a minimum of power is required for the dispersion of the substances.

Furthermore the present process may with advantage be made use of in the manufacture of margarine, for instance in order to effect the emulsifying of foreign fat into the dispersion liquid, for instance into milk deprived of its fat.

Different substances may be dispersed separately in the same dispersion medium by the action of one steam jet, as the latter is able to atomize simultaneously several liquid substances, an atomizing device of this type is illustrated in Figs. 4 and 5. 31 denotes the conduit through which steam is supplied and 32 is a receptacle provided with three separating walls 33, 34 and 35. To each of the three compartments separated from each other by the walls 33, 34 and 35, for instance a gelatine solution coloured by one of the three fundamental colours is supplied. Turpentine vapour is caused to flow through the pipe 31 and the three gelatine solutions are simultaneously atomized by the vapour jet at the gap 36 formed between the lower end of the pipe 31 and the bottom of the receptacle 32. The dispersion liquid into which the vapour jet together with the atomized substances is propected consists in this special case of turpentine. Each of the separate compartments is provided with a supply opening 38 for the substance to be dispersed. The height of the gap 36 can be adjusted by turning the nut 37. In this manner the emulsion required for manufacturing photographic plates for use with the colour photography is obtained.

I claim:

1. The continuous process of producing dispersoids such as emulsoids, suspensions and the like, which consists in mechanically atomizing the substance to be dispersed by means of an atomizing agent in the form of a hollow fluid jet by causing the substance to be dispersed to contact with the interior and the exterior of said hollow jet and in incorporating the atomizing agent together with the atomized substance carried by said jet in a dispersion medium by condensing the atomizing agent in the latter, the atomization being carried out within the body of the dispersion medium to obtain effective agitation.

2. The continuous process of producing dispersoids such as emulsions and the like, which comprises atomizing a plurality of substances by means of a single jet of atomizing medium in submerged contact with a dispersion medium in which the atomizing medium is condensable.

3. The continuous process of producing dispersoids such as emulsions and the like, which comprises atomizing a plurality of substances by means of a single jet of atomizing medium in submerged contact with a dispersion medium in which the atomizing medium is condensable and soluble.

4. The continuous process of producing dispersoids such as emulsions and the like, which comprises atomizing by means of a single hollow jet of an atomizing medium a plurality of substances having external and internal contact with said jet.

5. The continuous process of producing dispersoids such as emulsions and the like, which comprises atomizing by means of a single hollow jet of an atomizing medium a plurality of substances having external and internal contact with said jet in submerged contact with a dispersion liquid in which the medium is condensable.

6. A device for the continuous production of dispersoids such as emulsoids, suspensions and the like, comprising in combination, a conduit adapted to supply an atomizing agent, a second conduit arranged coaxially within the first conduit and adapted to supply a medium to be dispersed, the annular space between said conduits serving as nozzle means to cause the atomizing agent to take up the form of a hollow jet, closing means provided at the lower end of said second conduit and permitting of an access of the medium to be dispersed to the interior of said hollow jet, a receptacle surrounding the first conduit and arranged coaxially to the latter, means to supply the medium to be dispersed to said receptacle, a cover screwed to the lower end of said receptacle and provided with a central aperture surrounded by an upwardly projecting flange the upper edge of which ends at a small distance from the lower end of the first conduit thus forming a gap through which the medium to be dispersed and supplied to the receptacle gets into contact with the exterior of the hollow jet for atomization, and a receptacle adapted to hold a dispersion medium, said atomization means being arranged within the body of the dispersion medium contained in said receptacle.

7. An emulsifier, comprising a receptacle, an atomizing nozzle disposed within said receptacle, and comprising a downwardly extending supply tube for the atomizing agent, a casing surrounding the end of said tube and a dispersing cone spaced from the bottom of said tube to form a slot said casing supplying liquid through said slot into contact with the atomizing agent passing through said tube into the receptacle.

8. An emulsifier, comprising a receptacle, an atomizing nozzle disposed within said receptacle and comprising a casing having an adjustable bottom provided with a dispersing cone, a tube whose end enters said casing and is spaced from said cone to form a slot whose width is controlled by the adjustment of said bottom, and means to supply liquid to be dispersed to said casing.

In testimony whereof I affix my signature.

CARL ALEXANDER AGTHE.